(12) United States Patent
Schmidt et al.

(10) Patent No.: US 11,795,783 B2
(45) Date of Patent: Oct. 24, 2023

(54) METHOD AND SYSTEM FOR ACOUSTIC MONITORING AND PATTERN RECOGNITION IN HYDROCARBON MANAGEMENT ACTIVITIES

(71) Applicant: ExxonMobil Technology and Engineering Company, Spring, TX (US)

(72) Inventors: David J. Schmidt, Morristown, NJ (US); Krishnan Kumaran, Raritan, NJ (US); Donald Allen Burnett, Spring, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 473 days.

(21) Appl. No.: 16/863,123

(22) Filed: Apr. 30, 2020

(65) Prior Publication Data

US 2020/0370414 A1  Nov. 26, 2020

Related U.S. Application Data

(60) Provisional application No. 62/852,536, filed on May 24, 2019.

(51) Int. Cl.
*E21B 41/00* (2006.01)
*G01V 1/40* (2006.01)
(Continued)

(52) U.S. Cl.
CPC .............. *E21B 41/00* (2013.01); *G01V 1/288* (2013.01); *G01V 1/40* (2013.01); *E21B 43/123* (2013.01)

(58) Field of Classification Search
CPC ...... E21B 47/008; E21B 43/123; E21B 47/00; E21B 41/00; G01V 1/288; G01V 1/40; G01H 3/08
See application file for complete search history.

(56) References Cited

U.S. PATENT DOCUMENTS 5,458,200 A * 10/1995 Lagerlef ............... E21B 43/123
166/372
10,641,091 B2 * 5/2020 Chen ....................... E21B 49/08
(Continued)

FOREIGN PATENT DOCUMENTS

EP           3179277 A1 * 6/2017 ......... E21B 47/0005

OTHER PUBLICATIONS

Equipment Definition and Meaning-Merriam-Webster, accessed Dec. 5, 2022 via merriam-webster.com.*
(Continued)

*Primary Examiner* — Blake Michener
*Assistant Examiner* — Yanick A Akaragwe
(74) *Attorney, Agent, or Firm* — ExxonMobil Technology and Engineering Company—Law Department

(57) ABSTRACT

A method of identifying hydrocarbon production information is disclosed. In in a first hydrocarbon management environment, a first audio signal is detected and a characteristic acoustic fingerprint is identified therefrom. The fingerprint is stored in a memory, along with identifying information associated with the first signal. A second audio signal is detected and a characteristic acoustic fingerprint is identified therefrom. The fingerprints are compared, and if the fingerprints match the identifying information of the first audio signal is assigned to the second audio signal. A notification regarding the matching of the characteristic acoustic fingerprints of the first and second audio signals is issued.

18 Claims, 6 Drawing Sheets

(51) Int. Cl.
  *G01V 1/28* (2006.01)
  *E21B 43/02* (2006.01)
  *E21B 43/12* (2006.01)

(56) References Cited

U.S. PATENT DOCUMENTS

2012/0046866 A1* 2/2012 Meyer .................... E21B 28/00
                                                        702/6
2018/0238167 A1* 8/2018 Ravi ...................... G01V 1/226
2019/0033102 A1* 1/2019 Pionetti .................. E21B 17/01

OTHER PUBLICATIONS

Device Definition and Meaning-Merriam-Webster, accessed Apr. 13, 2023 via merriam-webster.com (Year: 2023).*

Ellis, E. (2006) "mp3read and mp3write for Matlab", Columbia University http://labrosa.ee.columbia.edu/matlab/mp3read.html, pp. 1-4.

Wang, A. (2003) "*An Industrial-Strength Audio Search Algorithm*", Proc. 2003 ISMIR International Symposium on Music Information Retrieval, Baltimore, MD.

* cited by examiner

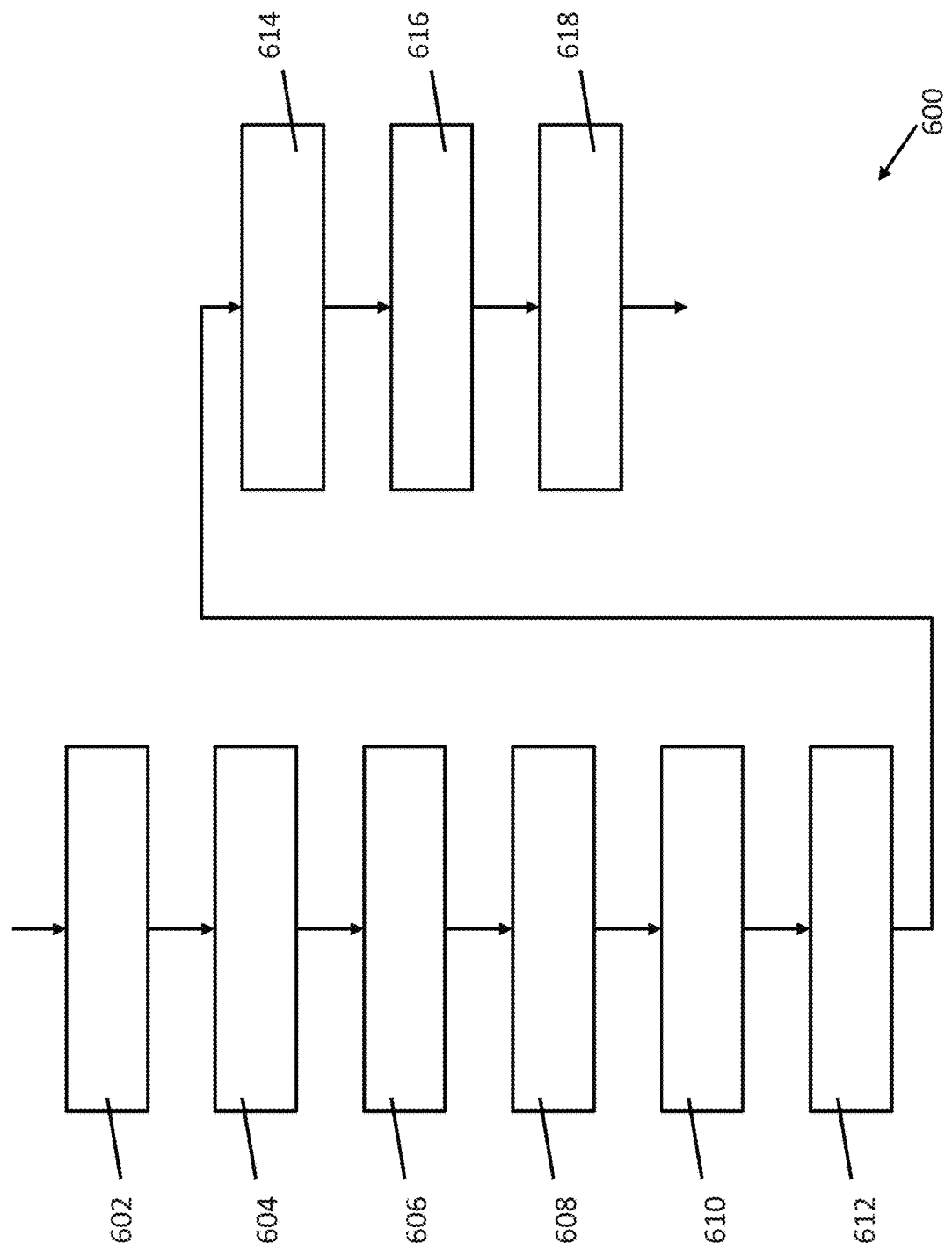

METHOD AND SYSTEM FOR ACOUSTIC MONITORING AND PATTERN RECOGNITION IN HYDROCARBON MANAGEMENT ACTIVITIES

CROSS REFERENCE TO RELATED APPLICATIONS

This application claims the priority benefit of U.S. Provisional Patent Application No. 62/852,536, filed May 24, 2019, entitled METHOD AND SYSTEM FOR ACOUSTIC MONITORING AND PATTERN RECOGNITION IN HYDROCARBON MANAGEMENT ACTIVITIES.

FIELD

The present disclosure relates generally to hydrocarbon operations. More specifically, the present disclosure relates to the use of audio recognition to capture, classify, and identify systems, equipment, and/or operating conditions in hydrocarbon management activities.

BACKGROUND

Many hydrocarbons production sites have high noise levels, with operating costs dependent on the types and scale of installed equipment and subsequent operations. In many situations, in-person visits are necessary to assess operating effectiveness and equipment status. Typically operators visit well pad sites according to a pre-defined map of site locations, and will conduct visual and auditory inspections of various equipment as they make assessments. During such inspections, information is gathered and compared against expected values and experience to determine if action is needed for equipment operation and maintenance.

The practice of periodic on-site visits has several drawbacks. As an operator may visit a site only periodically, sounds made intermittently by the equipment are not likely to be heard by the operator. Recording the sounds may not be effective because the sounds may not be able to be placed in context with the time the sound was made. Even an operator may mis-hear or be unable to pinpoint a location of a sound. Some acoustic signals may be at a frequency beyond the ability of a human to hear. Additionally, thousands of different types of equipment may be encountered at a hydrocarbon production site, such as a drilling site or a producing well pad, and it would be difficult if not impossible for even an experienced operator to recognize various sounds made by each piece of equipment. As such, there exists a need for a system to sense and characterize acoustic signals at a hydrocarbon production facility.

SUMMARY

In an aspect, a method of identifying hydrocarbon production information is provided. In a first hydrocarbon management environment, a first audio signal is detected. A characteristic acoustic fingerprint of the first audio signal is identified. The characteristic acoustic fingerprint of the first audio signal and identifying information associated with the first audio signal are stored in a memory. A second audio signal is detected in a second hydrocarbon management environment. A characteristic acoustic fingerprint of the second audio signal is identified. It is determined whether the characteristic acoustic fingerprint of the second audio signal matches the characteristic acoustic fingerprint of the first audio signal. If the characteristic acoustic fingerprint of the second audio signal matches the characteristic acoustic fingerprint of the first audio signal, assigning the identifying information associated with the first audio signal to the second audio signal. A notification is issued regarding the matching of the characteristic acoustic fingerprints of the first and second audio signals.

In another aspect, a computer system is provided. The system includes a non-transitory, computer-readable medium. A processor is in communication with the non-transitory, computer-readable medium. The processor is programmed to perform instructions stored on the non-transitory, computer-readable medium to identify hydrocarbon production information by: identifying a characteristic acoustic fingerprint of a first audio signal detected in a first hydrocarbon management environment; storing, in the non-transitory, computer-readable medium, the characteristic acoustic fingerprint of the first audio signal and identifying information associated with the first audio signal; identifying a characteristic acoustic fingerprint of a second audio signal detected in a second hydrocarbon management environment; determining whether the characteristic acoustic fingerprint of the second audio signal matches the characteristic acoustic fingerprint of the first audio signal; if the characteristic acoustic fingerprint of the second audio signal matches the characteristic acoustic fingerprint of the first audio signal, assigning the identifying information associated with the first audio signal to the second audio signal; and issuing a notification regarding the matching of the characteristic acoustic fingerprints of the first and second audio signals.

DESCRIPTION OF THE DRAWINGS

The present disclosure is susceptible to various modifications and alternative forms, specific exemplary aspects thereof have been shown in the drawings and are herein described in detail. It should be understood, however, that the description herein of specific exemplary aspects is not intended to limit the disclosure to the particular forms disclosed herein. This disclosure is to cover all modifications and equivalents as defined by the appended claims. It should also be understood that the drawings are not necessarily to scale, emphasis instead being placed upon clearly illustrating principles of exemplary aspects of the present disclosure. Moreover, certain dimensions may be exaggerated to help visually convey such principles. Further where considered appropriate, reference numerals may be repeated among the drawings to indicate corresponding or analogous elements. Moreover, two or more blocks or elements depicted as distinct or separate in the drawings may be combined into a single functional block or element. Similarly, a single block or element illustrated in the drawings may be implemented as multiple steps or by multiple elements in cooperation. The forms disclosed herein are illustrated by way of example, and not by way of limitation, in the figures of the accompanying drawings and in which like reference numerals refer to similar elements and in which:

FIG. 6 is a flowchart of a method according to disclosed aspects.

DETAILED DESCRIPTION

Terminology

Figure 1:
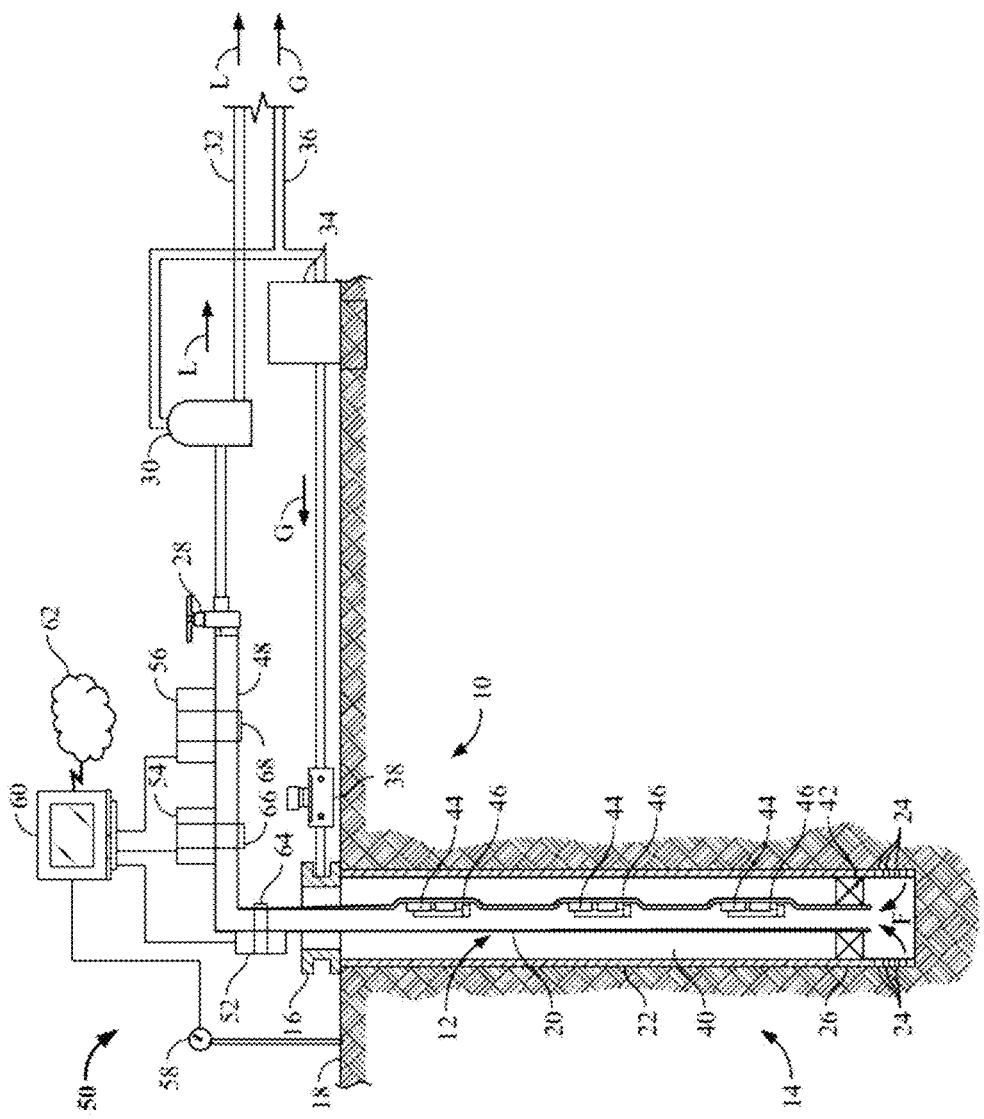
FIG. 1 is a side elevational view of an exemplary gas-lift well according to aspects of the disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

The articles "a" and "an" as used herein mean one or more when applied to any feature in aspects of the present disclosure described in the specification and claims. The use of "a" and "an" does not limit the meaning to a single feature unless such a limit is specifically stated. The term "a" or "an" entity refers to one or more of that entity. As such, the terms "a" (or "an"), "one or more" and "at least one" can be used interchangeably herein.

The term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one aspect, to A only (optionally including elements other than B); in another aspect, to B only (optionally including elements other than A); in yet another aspect, to both A and B (optionally including other elements). As used herein in the specification and in the claims, "or" should be understood to have the same meaning as "and/or" as defined above. For example, when separating items in a list, "or" "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of".

The adjective "any" means one, some, or all indiscriminately of whatever quantity.

As used herein, the phrase "at least one," in reference to a list of one or more elements, means at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one aspect, to at least one, optionally including more than one, A, with no B present (and optionally including elements other than B); in another aspect, to at least one, optionally including more than one, B, with no A present (and optionally including elements other than A); in yet another aspect, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

"Determining" encompasses a wide variety of actions, and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

Reference throughout the specification to "one aspect," "an aspect," "some aspects," or similar construction means that a particular component, feature, structure, method, or characteristic described in connection with the aspect is included in at least one aspect of the claimed subject matter. Thus, the appearance of the phrases "in one aspect" or "in an aspect" or "in some aspects" in various places throughout the specification are not necessarily all referring to the same aspect. Furthermore, the particular features, structures, methods, or characteristics may be combined in any suitable manner in one or more aspects.

The term "exemplary" is used exclusively herein to mean "serving as an example, instance, or illustration." Any aspect described herein as "exemplary" is not necessarily to be construed as preferred or advantageous over other aspects.

Flow diagram: Exemplary methods may be better appreciated with reference to flow diagrams or flow charts. While for purposes of simplicity of explanation, the illustrated methods are shown and described as a series of blocks, it is to be appreciated that the methods are not limited by the order of the blocks, as in different aspects some blocks may occur in different orders and/or concurrently with other blocks from that shown and described. Moreover, less than all the illustrated blocks may be required to implement an exemplary method. In some examples, blocks may be combined, may be separated into multiple components, may employ additional blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in series, and/or at substantially different points in time. In some examples, methods may be implemented as processor executable instructions. Thus, a machine-readable medium may store processor executable instructions that if executed by a machine (e.g., processor) cause the machine to perform a method.

The word "may" is used throughout this application in a permissive sense (i.e., having the potential to, being able to), not a mandatory sense (i.e., must).

Order of steps: It should also be understood that, unless clearly indicated to the contrary, in any methods claimed herein that include more than one step or act, the order of the steps or acts of the method is not necessarily limited to the order in which the steps or acts of the method are recited.

As used herein, the term "formation" refers to any definable subsurface region. The formation may contain one or more hydrocarbon-containing layers, one or more non-hydrocarbon containing layers, an overburden, and/or an underburden of any geologic formation.

As used herein, the term "hydrocarbon" refers to an organic compound that includes primarily, if not exclusively, the elements hydrogen and carbon. Examples of hydrocarbons include any form of natural gas, oil, coal, and bitumen that can be used as a fuel or upgraded into a fuel.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (20° C. and 1 atm pressure). Hydrocarbon fluids may include, for example, oil, natural gas, gas condensates, coal bed methane, shale oil, shale gas, and other hydrocarbons that are in a gaseous or liquid state.

As used herein, "hydrocarbon management" or "managing hydrocarbons" includes hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, carbon capture and/or injection, and any other hydrocarbon-related acts or activities.

As used herein, "hydrocarbon production" or "producing hydrocarbons" refers to any activity associated with extracting hydrocarbons from a well or other opening. Hydrocarbon production normally refers to any activity conducted in or on the well after the well is completed. Accordingly, hydrocarbon production or extraction includes not only primary hydrocarbon extraction but also secondary and tertiary production techniques, such as injection of gas or liquid for increasing drive pressure, mobilizing the hydrocarbon or treating by, for example chemicals or hydraulic fracturing the wellbore to promote increased flow, well servicing, well logging, and other well and wellbore treatments.

As used herein, the term "sensor" includes any sensing device or gauge capable of monitoring or detecting pressure, temperature, fluid flow, vibration, resistivity, acoustic and/or audio signals, or other formation and/or fluid data. The sensor may an electrical sensor, an optical sensor, or any other suitable type of sensor. Alternatively, the sensor may be a position sensor.

As used herein, the term "subsurface" refers to geologic strata occurring below the earth's surface.

A "surface mounted sensor" is meant a sensor capable of being mounted to a well's surface equipment, such as the skin surface of a pipe, tubular or other well component, the sensor capable of conveying information concerning conditions relatable to an aspect of fluid flow, including temperature, pressure, fluid flow rate, vibration, acoustics or the like.

As used herein, the term "wellbore" refers to a hole in the subsurface made by drilling or insertion of a conduit into the subsurface. A wellbore may have a substantially circular cross section, or other cross-sectional shape. As used herein, the term "well," when referring to an opening in the formation, may be used interchangeably with the term "wellbore."

Description

Specific forms will now be described further by way of example. While the following examples demonstrate certain forms of the subject matter disclosed herein, they are not to be interpreted as limiting the scope thereof, but rather as contributing to a complete description.

In the Figures, like numerals denote like, or similar, structures and/or features. Each of the illustrated structures and/or features may not be discussed in detail herein with reference to the figures. Similarly, each structure and/or feature may not be explicitly labeled in the figures; and any structure and/or feature that is discussed herein with reference to the figures may be used with any other structure and/or feature without departing from the scope of the present disclosure.

In general, structures and/or features that are, or are likely to be, included in a given aspect are indicated in solid lines in the figures, while optional structures and/or features are indicated in broken lines. However, a given aspect is not required to include all structures and/or features that are illustrated in solid lines therein, and any suitable number of such structures and/or features may be omitted from a given aspect without departing from the scope of the present disclosure.

In many research, development, manufacturing and refining operations, acoustics may provide an inexpensive and rapid means of gathering data about system status and historization. Furthermore, acoustics may be used to rapidly analyze systems in which the governing equations are too complicated to solve quickly, or are not fully understood.

According to disclosed aspects, audio recordings at a hydrocarbon production site are recorded and analyzed, and an operator or user is informed if there exists in the recordings an acoustically significant event. Any such detected events may be reported, as well as additional information associated with the closest match found in an existing library or dictionary of pre-analyzed data. The pre-analyzed data may be tagged with identifying information such as device or equipment type, equipment manufacturer, installation date, operation dates, and other information that may be helpful to identify the device or equipment generating the acoustic signal. Maintaining the pre-analyzed data in this manner provides a mechanism for capturing and cataloguing the expert knowledge for use in this algorithm as well as a larger machine learning or data mining recognition workflow.

A non-limiting example of a hydrocarbon production facility that may implement the disclosed aspects is a well, shown at reference number 10 in FIG. 1. It should be noted from the outset that the disclosed aspects are intended to be used in any type of hydrocarbon production facility, such as a drilling site, a production well, a well pad, gas/liquid separation facilities, pipelines, or the like. Referring now to FIG. 1, well 10 may be used to produce fluid from a wellbore 12 drilled or otherwise formed in a geological formation 14. A wellbore section of the well 10 is suspended below a wellhead 16 disposed, for example, at a surface 18 of the earth. A tubing 20 provides a flow path within wellbore 12 through which well fluid F is produced to wellhead 16.

As shown, wellbore 12 is lined with a wellbore casing 22 having perforations 24 through which fluid F flows from formation 14 into wellbore 12. For example, a hydrocarbon-based fluid F may flow from formation 14 through perforations 24 and into wellbore 12 adjacent an intake 26 of tubing 20. Upon entering wellbore 12, the well fluid F is produced upwardly through tubing 20 to wellhead 16. From wellhead 16, the produced well fluid F is directed through control valve 28 to a separator 30 where gas G and liquid L are separated. The substantially liquid portion L of well fluid F may be directed to another location (not shown), such as, by way of example, through conduit 32.

Although well 10 may comprise a wide variety of components, the example in FIG. 1 is illustrated as having a gas compressor 34 that receives an injection gas from separator 30, and, optionally, from a gas source (not shown). Gas compressor 34 forces the gas through a flow control valve 38, through wellhead 16 and into the annulus 40 between tubing 20 and casing 22. A packer 42 is designed to seal annulus 40 around tubing 20. In some aspects, packer 42 is disposed proximate intake 26, as shown.

The pressurized gas G flows through the annulus 40 and is forced into the interior of tubing 20 through one or more gas lift valves 44, which may be disposed, for example, in corresponding side pocket mandrels 46. The gas flowing through gas lift valves 44 draws well fluid into intake 26 and upwardly through the interior of tubing 20. The mixture of injected gas G and well fluid F move upwardly through control valve 28 and are separated at separator 30 which directs the injection gas G back to gas compressor 34, and the liquid L, comprising a mixture of hydrocarbons and water, through conduit 32 for further processing.

As may be appreciated, well fluid F combined with injected gas lift gas G comprises a multiphase fluid, resulting in a major portion of gas and a minor portion of liquids at surface flowline conditions. In some aspects, well fluid F may comprise greater than 50% gas and less than 50% liquids. There may be production periods where well fluid F may comprise substantially all gas, with intermittent or varying liquid production periods. The term multiphase fluid merely refers to a fluid that in some aspects or occasions may have multiple phases present, while during other aspects or occasions may comprise substantially 100% gas. The phase category of gas or liquid is determined at or near the well surface or wellhead.

Aspects disclosed herein employ data obtained from equipment employed in hydrocarbon production operations. Still referring to FIG. 1, a system 50 for obtaining and analyzing data from hydrocarbon production operations is depicted. System 50 includes one or more sensors. The sensors may include at least one temperature sensor 52, which may be a temperature transducer, thermocouple, thermistor, resistance temperature detector (RTD), or the like. In some aspects, the sensors include a plurality of surface mounted sensors, such as an acoustic sensor 54 and a sensor 56. Each of the sensors may be mounted to the gas lift well's surface equipment, such as, by way of example and not of limitation, a production conduit 48. System 50 may also include an ambient temperature sensor 58 positioned to monitor ambient temperature conditions at or near the well 10.

To process data obtained from the plurality of surface mounted sensors 52, 54 and/or 56, and the ambient temperature sensor 58, a computer 60 comprising storage means (not shown) and a processor for processing (not shown) may be employed. Computer 60 may be operatively connected to the internet to transmit data for monitoring and/or storage to a remote or cloud server 62. As may be appreciated by those skilled in the art, computer 60 may be present at the well site, as shown, or the data transmitted to a remote location via satellite, wireless, telephonic or other means of transmission.

According to disclosed aspects, audio or acoustic signals detected by acoustic sensor 54 are identified as being generated by specific equipment types, or equipment types operating at identifiable performance parameters. Each identified signal is analyzed to classify the signals according to a characteristic acoustic fingerprint, which according to an aspect may include time, amplitude, and frequency values of the signal. In an aspect, the values may be normalized and plotted on a common grid for easy comparison with the amplitude and frequency values derived from other audio or acoustic signals. According to one aspect, the time, amplitude, and frequency values of the signal may be used to generate amplitude and frequency envelopes that may be used in generating the characteristic acoustic fingerprint. Each audio or acoustic signal, with its respective identifying information and characteristic acoustic fingerprint, is stored in a location that can be accessed readily by a user or a computer program designed to process and identify acoustic signals. The location may be a memory location, a database, or a library. The identifying information may include: equipment type; equipment manufacturer; manufacturing details such as year of manufacture and/or overhaul; well environment, such as depth of equipment in the well; type of hydrocarbon fluid or other fluid surrounding, flowing through, or otherwise interacting with the equipment; characteristics of said fluid, such as composition, pressure, temperature, and/or flow rate; a condition of the equipment; an operating status of the equipment; and/or any other information relating to hydrocarbon production activities. For example, if the equipment were a valve operating in a subsurface well, the identifying information may include its identification as a valve, the valve manufacturer, approximate depth of the valve in the well, the type of fluid flowing through the valve, the composition, pressure, temperature, and/or flow rate of that fluid, and whether the valve is operating normally. Other types of equipment, or even the same types of equipment operating under different parameters and/or with different fluids/fluid characteristics, will have different identifying information—and different characteristic acoustic fingerprints—associated therewith.

A new audio or acoustic signal received by acoustic sensor 54, or by acoustic sensors at other hydrocarbon production facilities, is analyzed to classify it according to its characteristic acoustic fingerprint, which according to an aspect may be generated in a manner similar to characteristic acoustic fingerprints of previously received signal(s), and may for example include its amplitude and frequency envelopes derived from the new audio signal. The characteristic acoustic fingerprint of the new audio or acoustic signal is compared to the characteristic acoustic fingerprints previously obtained and stored in the memory location, database, or library. If the fingerprint of the new signal sufficiently matches one of the stored fingerprints, it is determined that the new signal and the signal corresponding to the matched stored fingerprint were made by sources having the same or similar identifying information, and therefore the new signal can be associated with, or assigned, the identifying information of the matched stored fingerprint. According to disclosed aspects, a match between characteristic acoustic fingerprints comprises computing a similarity measure such as a Euclidean distance metric between corresponding portions of the compared fingerprints. Other non-limiting methods of matching fingerprints may include: linear and/or non-linear transformations to the Euclidean distance metric to better cope with signal variations, such as noise, overlapping fingerprints, differences among sensor manufacturers, ambient conditions, and the like; filters and other limiting functions; Hamming distance metrics; Mahalanobis distance metrics; and other distance matching methods. The distance matching methods so employed may be used alone or in combination with each other to provide a user an indication of how close two characteristic acoustic fingerprints match each other. A "match", for the purposes of this disclosure, means that the distance matching method outputs a distance (e.g., a Euclidean distance) less than a predetermined number, which may be arbitrarily selected, set according to iterative learning exercises using training data, or otherwise set, using techniques known in the art. Such techniques may include grouping training data, i.e., signals, into groups manifesting common characteristics, and have a user identify the group; in effect, the user is inputting some of the identifying information associated with an audio signal. Subsequent use of the matching exercise will take into account such user-assisted grouping, as is known in the art. Other known methods of setting the predetermined distance (i.e., establishing a sufficient match) may be employed.

Positive and/or negative results of the comparison are reported to a user or operator, along with information that has been tagged with a matching result. In addition to visually displaying the matching values, the user report can graphically display when, in a received audio or acoustic signal, the match takes place, as well as providing a rough indication of match quality. The user report may list multiple potential matches. Furthermore, the user report may automatically, or as a result of user input, provide further surveillance or data acquisition to assist the user to identify the source of the newly acquired audio signal and/or obtain information about the source. For example, the user report may play or provide a link to an audio recording the stored and/or newly acquired signals, a video of a graphic rendering of part or all of the amplitude and/or frequency portions of the signal as a function of time, and/or a video of part or all of the hydrocarbon production facilities associated with the newly acquired audio/acoustic signal. Each of these possible options of the contents of the user report, whether automatically provided or delivered in response to user input, provides the user with near real-time information about the operations and/or management of the hydrocarbon production facilities.

Figure 2:
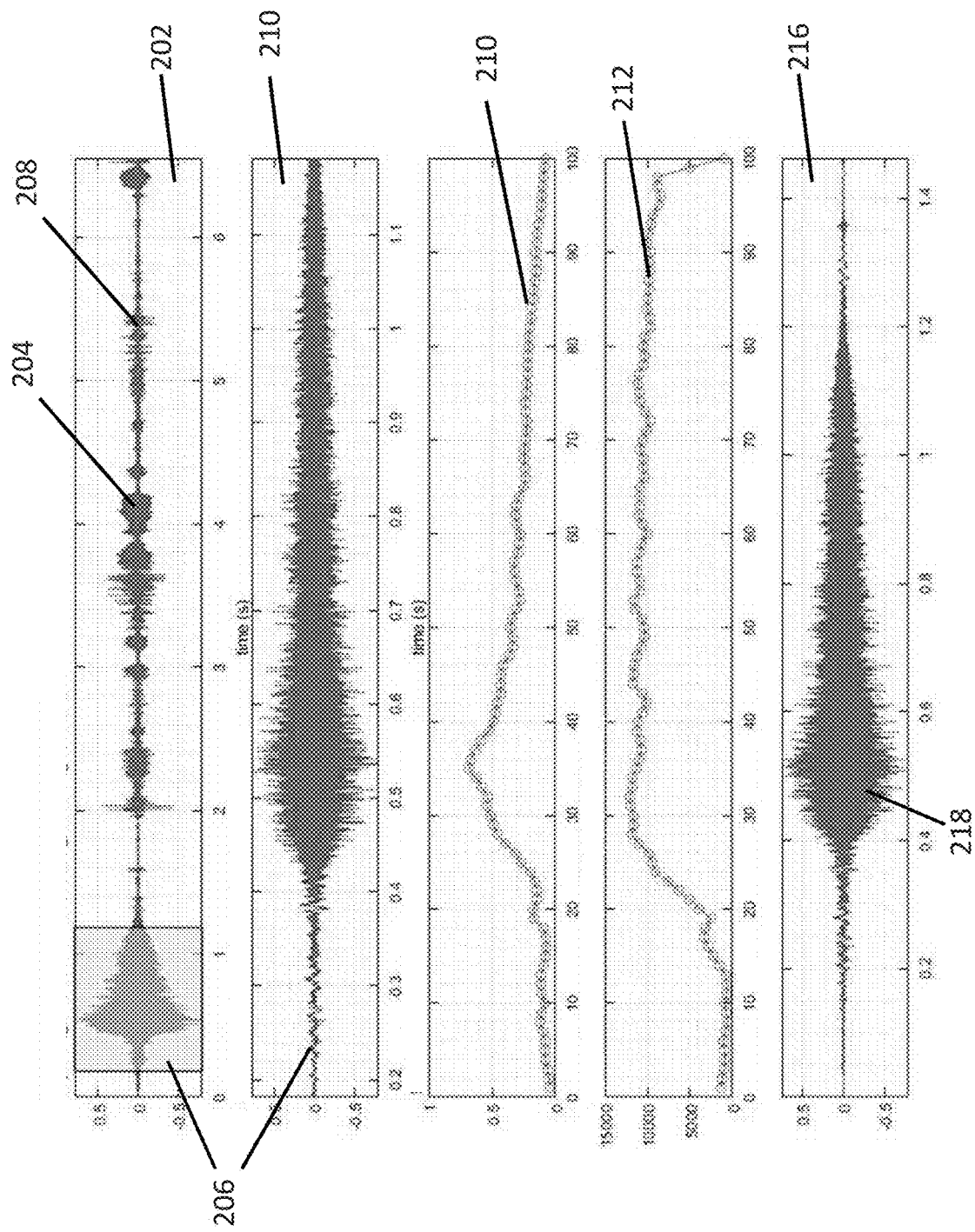
FIG. 2 is a series of graphs depicting audio signals and acoustic fingerprints according to aspects of the disclosure.

FIG. 2 illustrates a series of graphs demonstrating how the disclosed aspects may be used to identify the source of an audio or acoustic signal. Graph 202 represents a recording of an audio or acoustic signal 204 detected from an acoustic sensor, such as acoustic sensor 54. The signal 204 appears to include multiple discrete acoustic events, which may be defined as an acoustic signal time-bounded on either side by substantially complete attenuation. One or more of said events, or other parts of signal 204, may be analyzed according to the disclosed aspects. For example, portion 206 of signal 204 appears to represent a discrete acoustic event, as it is preceded and succeeded by substantially complete attenuation. Portion 206 also does not appear to resemble normal downhole noise, which is shown at 208. Portion 206 is shown expanded in time in graph 210. Portion 206 is analyzed and classified to determine a characteristic acoustic fingerprint, which in FIG. 2 is shown as an amplitude 212 and a frequency 214, both of which are shown as being scaled, shifted and/or normalized to be fit on a common grid or scale. The characteristic acoustic fingerprint 212, 214 is compared to stored characteristic acoustic fingerprints of other signals. The top match of the comparison is shown in graph 216, which displays an audio or acoustic signal 218 of a flush valve closing in a downhole environment. Because the characteristic acoustic fingerprints of signal 218 and portion 206 are so similar, it can be inferred that portion 206 also represents the sound of a flush valve closing.

Figure 3:
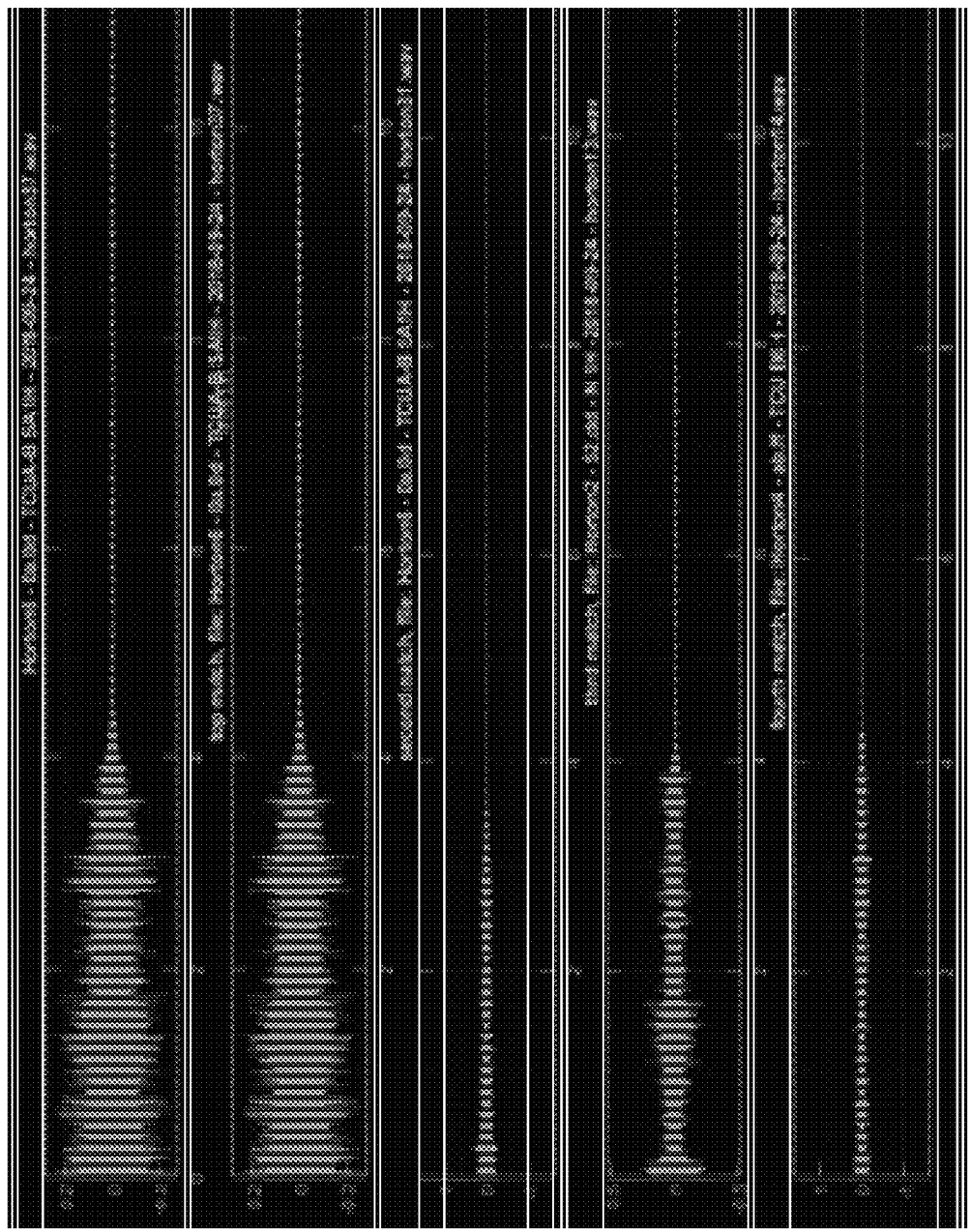
FIG. 3 is a series of graphs depicting multiple audio signals for comparison according to disclosed aspects.

It is possible that a new characteristic acoustic fingerprint matches more than one stored characteristic acoustic fingerprint. FIG. 3 depicts multiple normalized audio/acoustic recordings 304, 306, 308, 310 for which characteristic acoustic fingerprints have been stored. A new audio/acoustic recording 302 can be seen to match recording 304 most closely. While all of the stored recordings have similar lengths, matches 306, 308, and 310 display differences in amplitude, frequency, and/or attenuation rates when compared with recordings 302 and 304.

Figure 4:
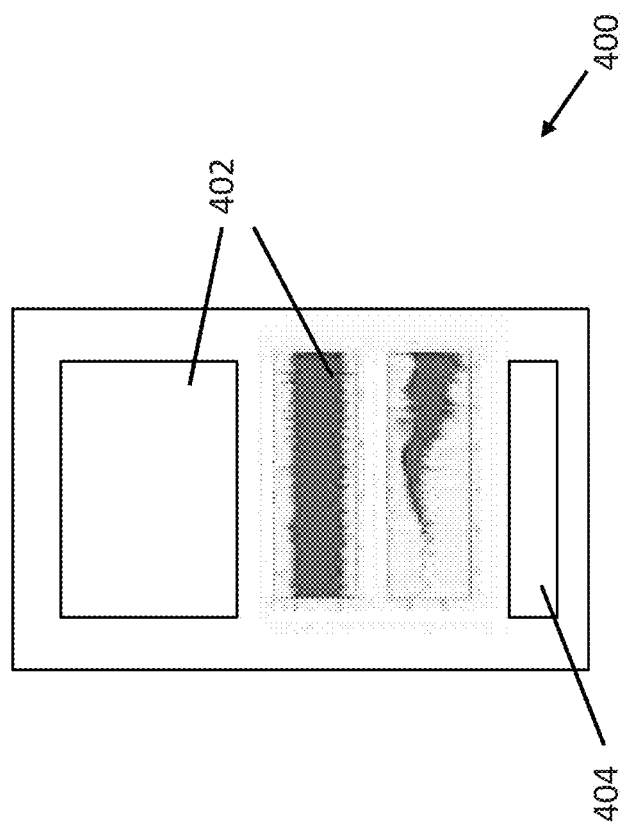
FIG. 4 is a depiction of a display output according to disclosed aspects.

Operator involvement in the disclosed aspects may be helpful for data retention, collaboration, and/or updates. According to disclosed aspects, a notification may be generated and sent to a user or operator. Such notification may be sent to a phone, other communications device, or another device connected wirelessly or through a wired connection to the disclosed system, to communicate any matches between audio/acoustic signals and stored signals. As depicted in FIG. 4, which is an example of a display 400 usable with the disclosed aspects, the notification may include message portions 402 that provide images, text, audio samples, video samples, identifying information of the matched signal, and other information as desired. The notification may also include an option 404 to establish and/or display additional surveillance on the hydrocarbon production environment from which the new audio/acoustic signal originated.

Figure 5:
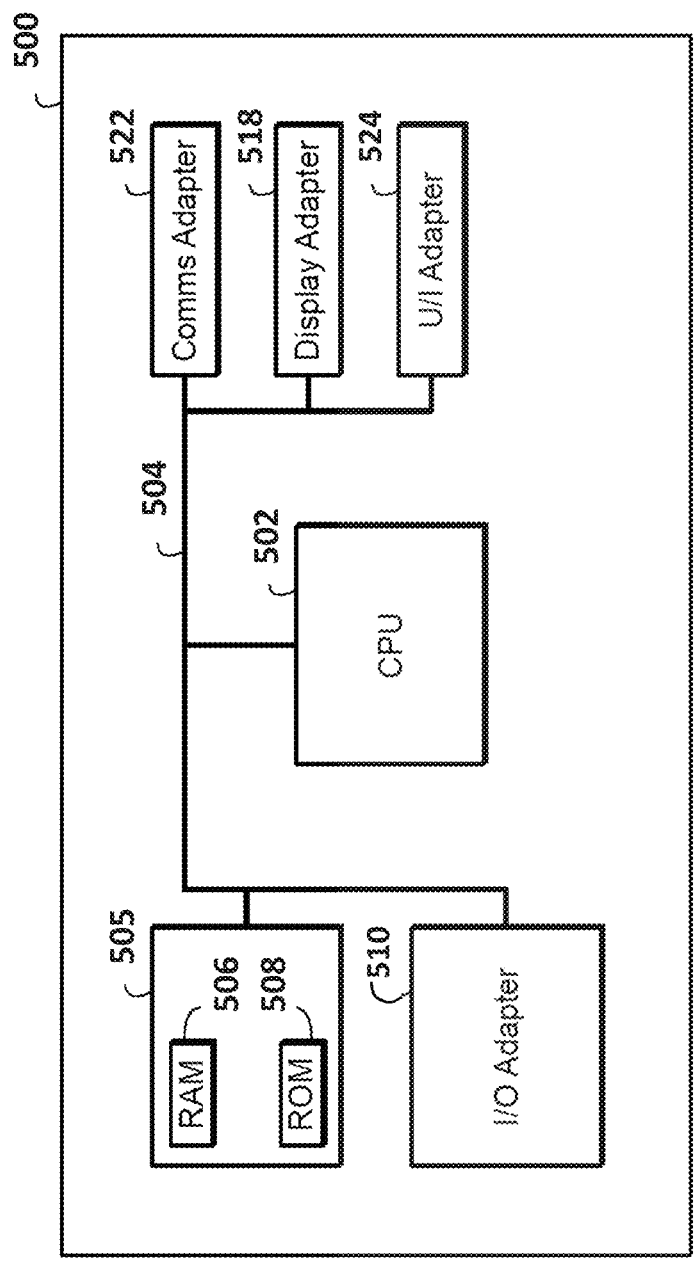
FIG. 5 is a block diagram of a general purpose computer system that may be used with the disclosed aspects.

One or more steps of the disclosed aspects may be accomplished using a computing device. For example, a computing device is particularly suited for automating repeated calculations necessary to analyze and compare audio/acoustic signals as disclosed herein. One of ordinary skill in the art will readily understand how to employ a computing device to accomplish various aspects of the disclosure. FIG. 5 is a block diagram of a general purpose computer system 500 suitable for implementing one or more aspects of the components described herein. In some disclosed aspects, the computer system 500 may comprise the architecture of computer 60 shown in FIG. 1. The computer system 500 includes a central processing unit (CPU) 502 coupled to a system bus 504. The CPU 502 may be any general-purpose CPU or other types of architectures of CPU 502 (or other components of exemplary system 500), as long as CPU 502 (and other components of system 500) supports the operations as described herein. Those of ordinary skill in the art will appreciate that, while only a single CPU 502 is shown in FIG. 5, additional CPUs may be present. Moreover, the computer system 500 may comprise a networked, multi-processor computer system that may include a hybrid parallel CPU/Graphics Processing Unit (GPU) system (not depicted). The CPU 502 may execute the various logical instructions according to various aspects. For example, the CPU 502 may execute machine-level instructions for performing processing according to the operational flow described above in conjunction with FIGS. 1-4 as well as the method described in FIG. 6.

The computer system 500 may also include computer components such as non-transitory, computer-readable media or memory 505. The memory 505 may include a RAM 506, which may be SRAM, DRAM, SDRAM, or the like. The memory 505 may also include additional non-transitory, computer-readable media such as a Read-Only-Memory (ROM) 508, which may be PROM, EPROM, EEPROM, or the like. RAM 506 and ROM 508 may hold user data, system data, data store(s), process(es), and/or software, as known in the art. The memory 505 may suitably store audio/acoustic signal recordings, characteristic acoustic fingerprints of received audio/acoustic signal recordings, identifying information, comparison histories, and other information as described in connection with FIGS. 1-4. The computer system 500 may also include an input/output (I/O) adapter 510, a communications adapter 522, a user interface adapter 524, and a display adapter 518.

The I/O adapter 510 may connect one or more additional non-transitory, computer-readable media such as an internal or external storage device(s) (not depicted), including, for example, a hard drive, a compact disc (CD) drive, a digital video disk (DVD) drive, a floppy disk drive, a tape drive, and the like to computer system 500. The storage device(s) may be used when the memory 505 is insufficient or otherwise unsuitable for the memory requirements associated with storing data for operations of aspects of the present techniques. The data storage of the computer system 500 may be used for storing information and/or other data used or generated as disclosed herein. For example, storage device(s) may be used to store audio/acoustic recordings, characteristic acoustic fingerprints, and identifying information in accordance with an aspect of the present techniques. Further, user interface adapter 524 may couple to one or more user input devices (not depicted), such as a keyboard, a pointing device and/or output devices, etc. to the computer system 500. The CPU 502 may drive the display adapter 518 to control the display on a display device (not depicted), e.g., a computer monitor or handheld display, to, for example, present information to the user regarding location.

The computer system 500 further includes communications adapter 522. The communications adapter 522 may comprise one or more separate components suitably configured for computer communications, e.g., one or more transmitters, receivers, transceivers, or other devices for sending and/or receiving signals. The computer communications adapter 522 may be configured with suitable hardware and/or logic to send data, receive data, or otherwise communicate over a wired interface or a wireless interface, e.g., carry out conventional wired and/or wireless computer communication, radio communications, near field communications (NFC), optical communications, scan an RFID device, or otherwise transmit and/or receive data using any currently existing or later-developed technology. In some aspects, the communications adapter 522 is configured to receive and interpret one or more signals indicating location, e.g., a GPS signal, a cellular telephone signal, a wireless fidelity (Wi-Fi) signal, etc.

The architecture of system 500 may be varied as desired. For example, any suitable processor-based device may be used, including without limitation personal computers, laptop computers, computer workstations, and multi-processor servers. Moreover, aspects may be implemented on application specific integrated circuits (ASICs) or very large scale integrated (VLSI) circuits. Additional alternative computer architectures may be suitably employed, e.g., using one or more operably connected external components to supplement and/or replace an integrated component. In fact, persons of ordinary skill in the art may use any number of suitable structures capable of executing logical operations according to the aspects. In an aspect, input data to the computer system 500 may include various plug-ins and library files. Input data may additionally include configuration information, audio files, acoustic fingerprints, identifying information, analysis and/or comparison algorithms, and the like.

FIG. 6 is a flowchart showing a method according to aspects of the disclosure. At block 602 a first audio signal is detected in a hydrocarbon management environment, such as a well pad, a subsurface hydrocarbon well, a hydrocarbon pipeline, or the like. At block 604 a characteristic acoustic fingerprint of the first audio signal is identified. The characteristic acoustic fingerprint may be identified by analyzing the duration, the amplitudes, and the frequencies of the first audio signal. At block 608, the characteristic acoustic fingerprint of the first audio signal, and identifying information associated therewith, are stored in a memory. At block 610 a second audio signal is detected in a second hydrocarbon management environment. The second hydrocarbon management environment may be the same or different from the first hydrocarbon management environment. At block 612 a characteristic acoustic fingerprint of the second audio signal is identified. This may be done in a similar fashion as with the characteristic acoustic fingerprint of the first audio signal. The content and format of the two fingerprints are sufficiently similar for a comparison to be made there between. At block 614 it is determined whether the characteristic acoustic fingerprint of the second audio signal matches the characteristic acoustic fingerprint of the first audio signal. This may be accomplished by comparing the fingerprints associated with the first and second audio signals. If the characteristic acoustic fingerprint of the second audio signal matches the characteristic acoustic fingerprint of the first audio signal, at block 616 the identifying information associated with the first audio signal is assigned to the second audio signal. At block 618 a notification is issued regarding the matching of the characteristic acoustic fingerprints of the first and second audio signals.

Because acoustic sensors can detect audio/acoustic signals from a distance, sensors mounted on surface equipment can detect desired audio signals originating in acoustically connected subsurface or otherwise distant locations, such as drill strings, wells, hydrocarbon reservoirs, pipes pipelines, or the like. The hardware required to implement the disclosed aspects therefore is a relatively inexpensive and non-invasive method of acquiring data and identifying events related to hydrocarbon management activities.

INDUSTRIAL APPLICABILITY

The apparatus and methods disclosed herein are applicable to the oil and gas industry.

Aspects of the disclosure may include any combinations of the methods and systems shown in the following numbered paragraphs. This is not to be considered a complete listing of all possible aspects, as any number of variations can be envisioned from the description above.

1. A method of identifying hydrocarbon production information, comprising:
   detecting, in a first hydrocarbon management environment, a first audio signal;
   identifying a characteristic acoustic fingerprint of the first audio signal;
   storing, in a memory, the characteristic acoustic fingerprint of the first audio signal and identifying information associated with the first audio signal;
   detecting, in a second hydrocarbon management environment, a second audio signal;
   identifying a characteristic acoustic fingerprint of the second audio signal;
   determining whether the characteristic acoustic fingerprint of the second audio signal matches the characteristic acoustic fingerprint of the first audio signal;
   if the characteristic acoustic fingerprint of the second audio signal matches the characteristic acoustic fingerprint of the first audio signal, assigning the identifying information associated with the first audio signal to the second audio signal; and
   issuing a notification regarding the matching of the characteristic acoustic fingerprints of the first and second audio signals.
2. The method of paragraph 1, wherein the identifying information comprises at least one of:
   a type of equipment that created the first audio signal;
   a manufacturer of the equipment;
   a condition of the equipment;
   an operating status of the equipment;
   a depth of the equipment in a hydrocarbon well;
   a type of a fluid surrounding, flowing through, or otherwise interacting with the equipment;
   a composition of the fluid;
   a pressure of the fluid; and
   a flow rate of the fluid.
3. The method of paragraph 1 or paragraph 2, wherein the characteristic acoustic fingerprint of the first audio signal is derived from at least one of
   an amplitude of the first audio signal,
   a frequency of the first audio signal, and
   a duration of the first audio signal.
4. The method of any one of paragraphs 1-3, further comprising:
   normalizing the characteristic acoustic fingerprint of the first audio signal before storing the characteristic acoustic fingerprint of the first audio signal; and
   normalizing the characteristic acoustic fingerprint of the second audio signal before determining whether the characteristic acoustic fingerprint of the second audio signal matches the characteristic acoustic fingerprint of the first audio signal.
5. The method of any one of paragraphs 1-4, wherein first audio signal is one of a plurality of audio signals, and further comprising:
   storing, in a memory,
      a characteristic acoustic fingerprint of each of the plurality of audio signals, and
      identifying information associated of each of the plurality of audio signals;
   wherein the determining step further comprises determining whether the characteristic acoustic fingerprint of the second audio signal matches the characteristic acoustic fingerprint of any of the plurality of audio signals; and
   wherein the assigning step further comprises assigning the identifying information associated with one of the plurality of audio signals to the second audio signal if the characteristic acoustic fingerprint of the second audio signal matches the characteristic acoustic fingerprint of said one of the plurality of audio signals.
6. The method of any one of paragraphs 1-5, further comprising:
   storing, in the memory, the first audio signal with its characteristic acoustic fingerprint and the assigned identifying information.
7. The method of any one of paragraphs 1-6, further comprising storing the second audio signal in the memory.
8. The method of any one of paragraphs 1-7, further comprising storing the first audio signal in the memory.
9. The method of any one of paragraphs 1-8, wherein the step of issuing a notification comprises:
   transmitting a message to a device regarding the matching of the characteristic acoustic fingerprints of the first and second audio signals, wherein the message includes at least one of
      at least part of the identifying information associated with the first characteristic acoustic fingerprint,
      a graphical display of at least one of the first and second audio signals,
      a graphical display of at least one of the first and second characteristic acoustic fingerprints, and
      an audio recording of at least one of the first and second audio signals.
10. The method of any one of paragraphs 1-9, wherein the step of issuing a notification comprises:
    transmitting a message to a device regarding the matching of the characteristic acoustic fingerprints of the first and second audio signals, wherein the message includes at least one of
       a video representation of at least one of the first and second characteristic acoustic fingerprints,
       a video of at least part of the second hydrocarbon production environment, and
       a notification of additional surveillance to be conducted of the second hydrocarbon production environment.
11. The method of any one of paragraphs 1-10, wherein the step of determining whether the characteristic acoustic fingerprint of the second audio signal matches the characteristic acoustic fingerprint of the first audio signal is performed using one or more of
    a Euclidean distance metric, and
    linear or nonlinear transformations to the Euclidean distance metric.
12. The method of any one of paragraphs 1-11, wherein the second hydrocarbon management environment is the same as the first hydrocarbon management environment.
13. The method of any one of paragraphs 1-12, wherein at least one of the first and second hydrocarbon management environments is a hydrocarbon drilling well pad.
14. A computer system, comprising:
    a non-transitory, computer-readable medium; and
    a processor in communication with the non-transitory, computer-readable medium, the processor programmed to perform instructions stored on the non-transitory, computer-readable medium to identify hydrocarbon production information by
    identifying a characteristic acoustic fingerprint of a first audio signal detected in a first hydrocarbon management environment;

storing, in the non-transitory, computer-readable medium, the characteristic acoustic fingerprint of the first audio signal and identifying information associated with the first audio signal;

identifying a characteristic acoustic fingerprint of a second audio signal detected in a second hydrocarbon management environment;

determining whether the characteristic acoustic fingerprint of the second audio signal matches the characteristic acoustic fingerprint of the first audio signal;

if the characteristic acoustic fingerprint of the second audio signal matches the characteristic acoustic fingerprint of the first audio signal, assigning the identifying information associated with the first audio signal to the second audio signal; and issuing a notification regarding the matching of the characteristic acoustic fingerprints of the first and second audio signals.

15. The computer system of paragraph 14, wherein the identifying information stored on the non-transitory, computer-readable medium comprises at least one of:
a type of equipment that created the first audio signal;
a manufacturer of the equipment;
a condition of the equipment;
an operating status of the equipment;
a depth of the equipment in a hydrocarbon well;
a type of a fluid surrounding, flowing through, or otherwise interacting with the equipment;
a composition of the fluid;
a pressure of the fluid; and
a flow rate of the fluid.

16. The computer system of paragraph 14 or paragraph 15, wherein the characteristic acoustic fingerprint of the first audio signal is derived from at least one of
an amplitude of the first audio signal,
a frequency of the first audio signal, and
a duration of the first audio signal.

17. The computer system of any one of paragraphs 14-16, further comprising instructions, stored on the non-transitory, computer-readable medium to:
normalize the characteristic acoustic fingerprint of the first audio signal before storing the characteristic acoustic fingerprint of the first audio signal; and
normalize the characteristic acoustic fingerprint of the second audio signal before determining whether the characteristic acoustic fingerprint of the second audio signal matches the characteristic acoustic fingerprint of the first audio signal.

18. The computer system of any one of paragraphs 14-17, wherein first audio signal is one of a plurality of audio signals, and further comprising instructions to:
store, in the non-transitory, computer-readable medium,
a characteristic acoustic fingerprint of each of the plurality of audio signals, and
identifying information associated of each of the plurality of audio signals;
determine whether the characteristic acoustic fingerprint of the second audio signal matches the characteristic acoustic fingerprint of any of the plurality of audio signals; and
assign the identifying information associated with one of the plurality of audio signals to the second audio signal if the characteristic acoustic fingerprint of the second audio signal matches the characteristic acoustic fingerprint of said one of the plurality of audio signals.

19. The computer system of any one of paragraphs 14-18, further comprising instructions to store, in the non-transitory, computer-readable medium, the first audio signal with its characteristic acoustic fingerprint and the assigned identifying information.

20. The computer system of any one of paragraphs 14-19, further comprising instructions to store the second audio signal in the non-transitory, computer-readable medium.

21. The computer system of any one of paragraphs 14-20, further comprising instructions to store the first audio signal in the non-transitory, computer-readable medium.

22. The computer system of any one of paragraphs 14-21, wherein the instructions for issuing a notification comprise instructions to:
transmit a message to a device regarding the matching of the characteristic acoustic fingerprints of the first and second audio signals, wherein the message includes at least one of
at least part of the identifying information associated with the first characteristic acoustic fingerprint,
a graphical display of at least one of the first and second audio signals,
a graphical display of at least one of the first and second characteristic acoustic fingerprints, and
an audio recording of at least one of the first and second audio signals.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A method of identifying hydrocarbon production information, comprising:
detecting, via a first acoustic sensor employed in a first hydrocarbon management environment, a first audio signal;
identifying a characteristic acoustic fingerprint of the first audio signal;
storing, in a memory, the characteristic acoustic fingerprint of the first audio signal and identifying information corresponding to a valve that created the first audio signal;
detecting, via a second acoustic sensor employed in a second hydrocarbon management environment, a second audio signal;
identifying a characteristic acoustic fingerprint of the second audio signal;
determining whether the characteristic acoustic fingerprint of the second audio signal matches the characteristic acoustic fingerprint of the first audio signal;
when the characteristic acoustic fingerprint of the second audio signal matches the characteristic acoustic fingerprint of the first audio signal, assigning the identifying information associated with the first audio signal to the second audio signal; and
issuing a notification regarding the matching of the characteristic acoustic fingerprints of the first and second audio signals, wherein the notification comprises the identifying information corresponding to the valve that created the first audio signal.

2. The method of claim 1, wherein the characteristic acoustic fingerprint of the first audio signal is derived from at least one of:
- an amplitude of the first audio signal,
- a frequency of the first audio signal, and
- a duration of the first audio signal.

3. The method of claim 1, further comprising:
- normalizing the characteristic acoustic fingerprint of the first audio signal before storing the characteristic acoustic fingerprint of the first audio signal; and
- normalizing the characteristic acoustic fingerprint of the second audio signal before determining whether the characteristic acoustic fingerprint of the second audio signal matches the characteristic acoustic fingerprint of the first audio signal.

4. The method of claim 1, wherein the first audio signal is one of a plurality of audio signals, and further comprising:
- storing, in a memory,
  - a characteristic acoustic fingerprint of each of the plurality of audio signals, and
  - identifying information associated of each of the plurality of audio signals;
- wherein the determining step further comprises determining whether the characteristic acoustic fingerprint of the second audio signal matches the characteristic acoustic fingerprint of any of the plurality of audio signals; and
- wherein the assigning step further comprises assigning the identifying information associated with one of the plurality of audio signals to the second audio signal if the characteristic acoustic fingerprint of the second audio signal matches the characteristic acoustic fingerprint of said one of the plurality of audio signals.

5. The method of claim 1, further comprising:
- storing, in the memory, the first audio signal with its characteristic acoustic fingerprint and the assigned identifying information.

6. The method of claim 1, further comprising storing, in the memory, at least one of the first audio signal and the second audio signal.

7. The method of claim 1, wherein the step of issuing a notification comprises:
- transmitting a message to a device regarding the matching of the characteristic acoustic fingerprints of the first and second audio signals, wherein the message includes at least one of:
  - at least part of the identifying information associated with the first characteristic acoustic fingerprint,
  - a graphical display of at least one of the first and second audio signals,
  - a graphical display of at least one of the first and second characteristic acoustic fingerprints, and
  - an audio recording of at least one of the first and second audio signals.

8. The method of claim 1, wherein the step of issuing a notification comprises:
- transmitting a message to a device regarding the matching of the characteristic acoustic fingerprints of the first and second audio signals,
  - wherein the message includes at least one of:
    - a video representation of at least one of the first and second characteristic acoustic fingerprints,
    - a video of at least part of the second hydrocarbon management environment, and
    - a notification of additional surveillance to be conducted of the second hydrocarbon management environment.

9. The method of claim 1, wherein the step of determining whether the characteristic acoustic fingerprint of the second audio signal matches the characteristic acoustic fingerprint of the first audio signal is performed using one or more of:
- a Euclidean distance metric, and
- linear or nonlinear transformations to the Euclidean distance metric.

10. The method of claim 1, wherein the second hydrocarbon management environment is the same as the first hydrocarbon management environment, and wherein the first acoustic sensor is the same as the second acoustic sensor.

11. The method of claim 1, wherein at least one of the first and second hydrocarbon management environments is a hydrocarbon drilling well pad.

12. A computer system, comprising:
- a non-transitory, computer-readable medium; and
- a processor in communication with the non-transitory, computer-readable medium, the processor programmed to perform instructions stored on the non-transitory, computer-readable medium to identify hydrocarbon production information by:
  - identifying a characteristic acoustic fingerprint of a first audio signal detected via a first acoustic sensor employed in a first hydrocarbon management environment;
  - storing, in the non-transitory, computer-readable medium, the characteristic acoustic fingerprint of the first audio signal and identifying information corresponding to a valve that created the first audio signal;
  - identifying a characteristic acoustic fingerprint of a second audio signal detected via a second acoustic sensor employed in a second hydrocarbon management environment;
  - determining whether the characteristic acoustic fingerprint of the second audio signal matches the characteristic acoustic fingerprint of the first audio signal;
  - when the characteristic acoustic fingerprint of the second audio signal matches the characteristic acoustic fingerprint of the first audio signal, assigning the identifying information associated with the first audio signal to the second audio signal; and
  - issuing a notification regarding the matching of the characteristic acoustic fingerprints of the first and second audio signals, wherein the notification comprises the identifying information corresponding to the valve that created the first audio signal.

13. The computer system of claim 12, wherein the characteristic acoustic fingerprint of the first audio signal is derived from at least one of:
- an amplitude of the first audio signal,
- a frequency of the first audio signal, and
- a duration of the first audio signal.

14. The computer system of claim 12, further comprising instructions, stored on the non-transitory, computer-readable medium to:
- normalize the characteristic acoustic fingerprint of the first audio signal before storing the characteristic acoustic fingerprint of the first audio signal; and
- normalize the characteristic acoustic fingerprint of the second audio signal before determining whether the characteristic acoustic fingerprint of the second audio signal matches the characteristic acoustic fingerprint of the first audio signal.

15. The computer system of claim 12, wherein the first audio signal is one of a plurality of audio signals, and further comprising instructions to:

store, in the non-transitory, computer-readable medium,
    a characteristic acoustic fingerprint of each of the plurality of audio signals, and
    identifying information associated of each of the plurality of audio signals;
determine whether the characteristic acoustic fingerprint of the second audio signal matches the characteristic acoustic fingerprint of any of the plurality of audio signals; and
assign the identifying information associated with one of the plurality of audio signals to the second audio signal if the characteristic acoustic fingerprint of the second audio signal matches the characteristic acoustic fingerprint of said one of the plurality of audio signals.

16. The computer system of claim 12, further comprising instructions to store, in the non-transitory, computer-readable medium, the first audio signal with its characteristic acoustic fingerprint and the assigned identifying information.

17. The computer system of claim 12, further comprising instructions to store, in the non-transitory, computer-readable medium, at least one of the first audio signal and the second audio signal.

18. The computer system of claim 12, wherein the instructions for issuing a notification comprise instructions to:
    transmit a message to a device regarding the matching of the characteristic acoustic fingerprints of the first and second audio signals, wherein the message includes at least one of:
        at least part of the identifying information associated with the first characteristic acoustic fingerprint,
        a graphical display of at least one of the first and second audio signals,
        a graphical display of at least one of the first and second characteristic acoustic fingerprints, and
    an audio recording of at least one of the first and second audio signals.

* * * * *